(12) United States Patent
Koen

(10) Patent No.: US 8,587,420 B2
(45) Date of Patent: Nov. 19, 2013

(54) UNIFIED VEHICLE PARAMETERS

(75) Inventor: Robert John Koen, Vancouver (CA)

(73) Assignee: Webtech Wireless Inc., Burnaby (CA)

(*) Notice: Subject to any disclaimer, the term of this patent is extended or adjusted under 35 U.S.C. 154(b) by 573 days.

(21) Appl. No.: 12/815,309

(22) Filed: Jun. 14, 2010

(65) Prior Publication Data

US 2010/0265052 A1 Oct. 21, 2010

Related U.S. Application Data

(63) Continuation-in-part of application No. 12/453,195, filed on May 1, 2009, now Pat. No. 7,940,173, which is a continuation of application No. 11/585,149, filed on Oct. 24, 2006, now Pat. No. 7,538,667.

(51) Int. Cl.
*B60Q 1/00* (2006.01)

(52) U.S. Cl.
USPC ..................... 340/438; 340/539.13

(58) Field of Classification Search
USPC ......... 340/438, 539.13, 988; 701/35, 29, 438, 701/32
See application file for complete search history.

(56) References Cited

U.S. PATENT DOCUMENTS

| | | | |
|---|---|---|---|
| 5,311,197 A | 5/1994 | Sorden et al. | |
| 5,974,312 A | 10/1999 | Hayes, Jr. et al. | |
| 6,031,828 A | 2/2000 | Koro et al. | |
| 6,295,449 B1 | 9/2001 | Westerlage et al. | |
| 6,314,270 B1 | 11/2001 | Uchida | |
| 6,862,524 B1 | 3/2005 | Nagda | |
| 6,922,547 B2 | 7/2005 | O'Neill et al. | |
| 6,934,544 B2 | 8/2005 | Cooper | |
| 7,196,621 B2 | 3/2007 | Kochis | |
| 7,339,469 B2 | 3/2008 | Braun | |
| 7,408,502 B2 | 8/2008 | Percy et al. | |
| 7,451,042 B2 | 11/2008 | Uyeki et al. | |
| 7,480,563 B2 | 1/2009 | Ichimura | |
| 2003/0227395 A1 | 12/2003 | Zeineh | |
| 2004/0012506 A1 | 1/2004 | Fujiwara et al. | |
| 2005/0171663 A1* | 8/2005 | Mittelsteadt et al. | 701/35 |
| 2006/0061469 A1 | 3/2006 | Jaeger et al. | |
| 2006/0122749 A1* | 6/2006 | Phelan et al. | 701/35 |
| 2006/0220842 A1 | 10/2006 | Breed | |
| 2006/0238347 A1 | 10/2006 | Parkinson et al. | |
| 2008/0094209 A1 | 4/2008 | Braun | |
| 2008/0186162 A1 | 8/2008 | Rajan et al. | |

FOREIGN PATENT DOCUMENTS

| | | |
|---|---|---|
| WO | WO/99/34339 | 7/1999 |
| WO | WO/00/56016 | 9/2000 |
| WO | WO/00/70889 | 11/2000 |
| WO | WO/01/03414 | 1/2001 |

OTHER PUBLICATIONS

Non-Final Office Action dated Oct. 6, 2010 issued for co-pending U.S. Appl. No. 12/453,195.

* cited by examiner

*Primary Examiner* — Shirley Lu

(74) *Attorney, Agent, or Firm* — John R. Flanagan

(57) ABSTRACT

Data flow from a vehicle telematics device to a remote host, rationalized regardless of the source of the data and its format. Disclosed is a method to unify and process data from multiple sources into singular information for use within the telematics device for vehicle usage data, driver performance, and location data.

18 Claims, 1 Drawing Sheet

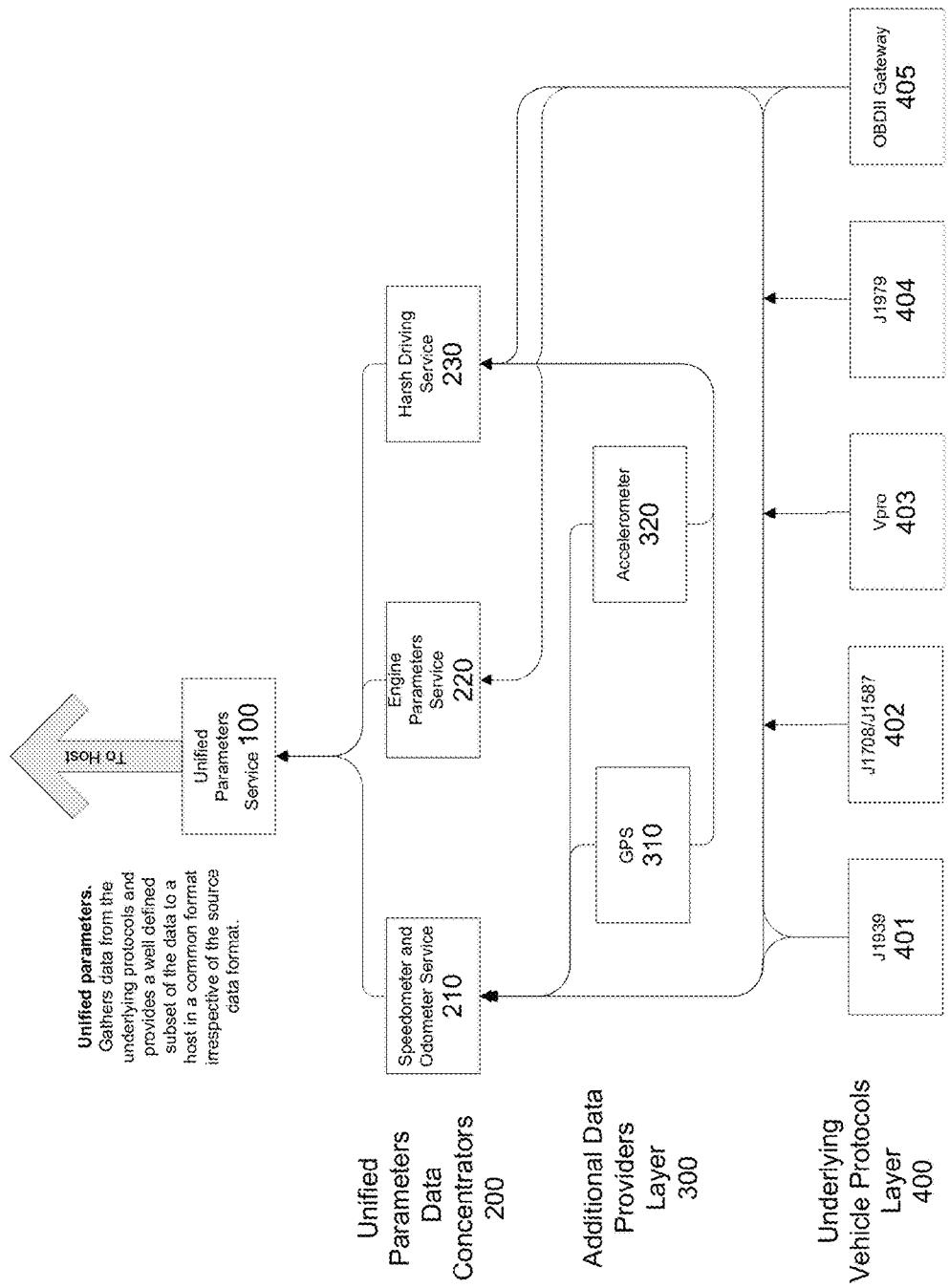

UNIFIED VEHICLE PARAMETERS

CROSS-REFERENCE TO RELATED APPLICATION

This application is a CIP of application Ser. No. 12/453,195 filed May 1, 2009 now U.S. Pat. No. 7,970,173, which is a continuation of application Ser. No. 11/585,149, filed Oct. 24, 2006 now U.S. Pat. No. 7,538,667; the entire contents of which applications are incorporated herein by reference and all owned by common assignee.

NOTICE REGARDING COPYRIGHTED MATERIAL

A portion of the disclosure of this patent document contains material which is subject to copyright protection. The copyright owner has no objection to the facsimile reproduction of the patent document or the patent disclosure as it appears in the Patent and Trademark Office file or records, but otherwise reserves all copyright rights whatsoever.

FIELD OF THE INVENTION

This invention relates to developing telematics information.

BACKGROUND OF THE INVENTION

Conventionally, multiple sources of similar information (e.g. vehicle speed) were processed in multiple ways within the telematics device depending on the source. And then reports were sent to a remote host in different formats depending on the source of the information. This resulted in multiple reports being developed on the host. Conventionally, there was at least one report for each source. Also, sending raw data increases wireless data usage. These limitations and others, are addressed by the present invention.

SUMMARY OF INVENTION

The present invention rationalizes the data flow from a vehicle telematics device to a host and does so regardless of the source of the data and its format.

The present invention unifies and processes data from multiple sources into singular information for use within the telematics device for vehicle usage data, driver performance, and location data.

Accordingly, the present invention is directed to a method for reporting vehicle data which includes processor implemented steps of: receiving a user specified parameter to be reported; determining, from a plurality of sources of data connected to the processor, which source of data to use for the parameter; obtaining data from the determined source of data; and transmitting, to a remote host, a value of the parameter based on the obtained data.

BRIEF DESCRIPTION OF THE DRAWINGS

A better understanding of the present invention can be obtained when the following detailed description of the preferred embodiment is considered in conjunction with the following drawings, in which:

FIG. 1 is a diagram that shows the organization of the sources and flow of data resulting in Unified Parameters Service 100.

DETAILED DESCRIPTION

Well known in the art, is an automotive data acquisition system for collecting data from a vehicle, the system being connected to a vehicle diagnostics connector provided in a vehicle through a standard protocol interface such as CAN, J1850, or ISO9141 interface, amongst others. This invention unifies data from the following sources: GPS, Accelerometer, J1979, J1939, J1587, OBDII gateway and Vehicle proprietary data. Also, although the application of OBD-II and the protocols are indicated in the preferred embodiment herein, it will be appreciated that the automotive data acquisition system can also be applied (or modified to apply) to other or future generations of on-board diagnostic systems and protocols without exceeding the scope of the present invention.

One main idea of the present invention of Unified Parameters is to allow a well defined set of vehicle parameters to be reported in a standard way regardless of the type of vehicle and the format of the vehicle data source. Since the parameters are well defined there is no need to be able to specify averaging or rate of change of the values. For example, traditionally monitoring of hard braking has been achieved by monitoring the rate of change of the speed of the vehicle. According to the present invention, the user only needs to specify the hard braking parameter and the method used to determine hard braking is determined internally once the best source of raw data is determined.

With reference to FIG. 1, the (bottom) Underlying Vehicle Protocols Layer 400 can include, for examples, for heavy trucks, J1939 401 and J1708/J1587 402; and for light and medium duty cars/trucks, J1979 404, OBDII gateway 405 and Vpro (proprietary protocols) 403.

Upstream of Layer 400 is Unified Parameters Data Concentrators Layer 200 which includes (as non-limiting examples) Speedometer and Odometer Service-SOS 210, Engine Parameters Service-EPS 220 and Harsh Driving Service-HDS 230 (that will be explained more below). Each protocol of the Underlying Vehicle Protocols Layer 400 is a possible source of data for each of SOS 210, EPS 220 and HDS 230.

Additional Data Providers Layer 300 includes (as non-limiting examples) GPS subsystem or service 310 and Accelerometer subsystem or service 320, each of which is a possible source of data to SOS 210 and HDS 230.

Unified Parameters Service 100 allows users to define Unified Parameters 101 having specified desired data and format, and to automatically gather data (from the associated Underlying Vehicle Protocols Layer 400 and Additional Data Providers Layer 300) and then to send to a host in the desired (common) format irrespective of the source data format. This invention provides the "middle-ware" or "intelligence" between the high level user-configuration interface and the downstream, lower levels of vehicle protocols and related data sources (lower Layers 300 and 400) to obtain the user-required and optimal sources of information to feed into uniform parameter reporting as defined and requested by user.

Table 1 presents some examplary Unified Parameters 101 that may be defined by user in Unified Parameters Service 100, then monitored in a vehicle and reported to Unified Parameters Service 100 as requested by user or by a user-configured event-triggering scheme. Unified Parameters Service 100 then sends the requested report to a remote host intelligence (or is interrogated for such report by intelligence upstream of Unified Parameters Service 100).

TABLE 1

| Unified Parameters 101 | | Units | Service provider |
|---|---|---|---|
| Engine time | ETM | seconds | EPS |
| Idle time | ITM | Seconds | SOS |
| Moving time | MTM | Seconds | SOS |
| Total Distance/Odometer | ODO | Meters | SOS |
| Trip Odometer | TRO | Meters | SOS |
| Total Fuel | TFL | Liters | EPS |
| Trip Fuel | TRF | Liters | EPS |
| Fuel Level | FLV | Percent | EPS |
| Idle Fuel | IFL | Liters | EPS |
| Moving Fuel | MFL | Liters | EPS |
| Fuel economy | FEC | km/liter | EPS |
| Max speed | MSP | km/hour | SOS |
| Speeding duration | SPD | Seconds | SOS |
| Speeding count | SPC | # of occurrences | SOS |
| Excess speeding duration | ESD | seconds | SOS |
| Excess speeding count | ESC | # of occurrences | SOS |
| Max | RPM | RPM | EPS |
| Over RPM duration | ORD | seconds | EPS |
| Over RPM count | ORC | # of occurrences | EPS |
| Extreme RPM Count | ERC | # of occurrences | EPS |
| Braking Count | BRC | # of occurrences | HDS |
| Hard Braking Count | HBC | # of occurrences | HDS |
| Extreme Braking Count | EBC | # of occurrences | HDS |
| Harsh Acceleration Count | HAC | # of occurrences | HDS |
| Extreme Harsh Acceleration Count | EHA | # of occurrences | HDS |
| Sharp Turn Count | STC | # of occurrences | HDS |
| Extreme Sharp Turn Count | EST | # of occurrences | HDS |
| PTO count | PTC | # of occurrences | EPS |
| Total PTO duration | PTD | Seconds | EPS |
| PTO Fuel | PFL | Liters | EPS |
| Cruise control duration | CCT | Seconds | EPS |
| Cruise Control Distance | CCD | Meters | EPS |

SOS 210 is a speedometer and odometer tracking system that interrogates all the possible (i.e. defined) sources of speedometer and odometer data and makes an intelligent choice of best source(s). Generally, it may use one or more of Underlying Vehicle Protocols 400 and also a source from Additional Data Providers Layer 300 such as GPS 310. A (non-limiting) example of the possible sources of speedometer and odometer data, and their rank in terms of quality of service is show in Table 2.

TABLE 2

| Source | Speed | Odometer | Trip Odometer | Rank |
|---|---|---|---|---|
| GPS | ✓ | ✓ | X | 6 |
| JBUS | ✓ | ✓ | X | 1 |
| OBDII gateway | ✓ | Sometimes | ✓ | 2 |
| J1979 | ✓ | ✓ | ✓ | 3 |
| J1939 | ✓ | ✓ | ✓ | 4 |
| Vpro | sometimes | sometimes | X | 5 |

In cases where SOS 210 odometer updates are low resolution then GPS may be used to provide higher resolution. For instance, the odometer from the OBDII gateway only updates once per mile. Better odometer resolution may be gained by updating the internal odometer from the GPS in between the occasional updates from the OBDII gateway.

Engine Parameters Service EPS 220 operates by acquiring engine data from usually one protocol (but potentially more than one) of the available Underlying Vehicle Protocols Layer 400. These protocols are J1708/J1587, J1979, J1939, or Vpro. EPS 220 then formulates each of the applicable Unified Parameter(s) 101 from the acquired data. Many of the data points are formulated simply by either passing the data through "as is", or by applying a conversion factor to convert from the native data format to the format specified by the associated Unified Parameter 101. An example would be converting the Trip Fuel reported by J1708/J1587 in ⅛ths of a gallon to a Unified Parameter 101 format of liters. In other cases, EPS 220 must calculate Unified Parameter 101 data from multiple sources in Underlying Vehicle Protocols Layer 400. An example would be the calculation of Moving Fuel by integrating instantaneous fuel rate over time while the vehicle speed is greater than zero.

Harsh Driving service HDS 230 operates by acquiring acceleration and deceleration data from the vehicle onboard Accelerometer service 320. Optionally acceleration data is acquired from a protocol of Underlying Vehicle Protocols Layer 400 or from GPS service 310. This data is obtaining speed from the underlying services and protocols and then taking the rate of change of speed over time to produce acceleration and deceleration values. These values are then compared to configurable limits to determine such Unified Parameters 101 as Harsh Acceleration and Harsh Braking. The accelerometer can also produce lateral acceleration data from which EPS 230 can calculate data for Unified Parameter 101 of Sharp Turn Count.

A (non-limiting) example of the possible sources of data for, Hard Braking Count, Extreme Braking Count, Harsh Acceleration Count, and their rank in terms of quality of service, is show in Table 3.

TABLE 3

| Source | Harsh acceleration | Harsh Braking | Harsh turns | Rank |
|---|---|---|---|---|
| Accelerometer | ✓ | ✓ | ✓ | 1 |
| GPS | ✓ | ✓ | X | X |
| JBUS | ✓ | ✓ | X | X |
| OBDII gateway | X | X | X | X |
| J1979 | ✓ | ✓ | X | X |
| J1939 | ✓ | ✓ | X | X |
| Vpro | sometimes | sometimes | X | X |

Both GPS Service 310 and Accelerometer Service 320 can be provided by conventional systems and technologies well known in the art. Furthermore, and optionally, some aspects of Accelerometer Service 320 can be provided by the disclosure of co-pending U.S. application Ser. No. 12/656,657 (filed Feb. 12, 2010), whose contents are incorporated herein.

The invention requires the capability to monitor Underlying Vehicle Protocols 400. This implies that the required hardware and firmware capabilities are in place and that the underlying protocols must be configured to gather the data required by Unified Parameters Service 100. A minimum set of parameters must be (defined and) configured in Underlying Vehicle Protocols Layer 400 for Unified Parameters Service 100. Examples are provided next.

For J1790/J1587, the following are required (in format <PID, Parameter ID>)-(84, Road speed; 96, Fuel level; 190, RPM; 236, Idle fuel; 245, Odometer; 247, Total engine hours; 248, Total PTO hours; 250, Total fuel).

For J1979, the following are required (in format <PID, Parameter ID>)-(10D, Road speed; 10C, RPM; 9982, Trip fuel; 9983, Trip odometer)

For J1939, the following are required (in format <SPN, Parameter>)-(84, Road speed; 96, Fuel level; 190, RPM; 236, Idle fuel; 245 Odometer (or 917); 247, Total engine hours; 248, Total PTO hours; 250, Total fuel; 917 Odometer (or 245))

For VPro (proprietary), the following are required (in format <PID, Parameter>)-(200, Road speed; 201, RPM; 202, Odometer; 234, Trip odometer; 235, Trip fuel)

As an example, the "moving fuel" parameter one that ordinarily is not easy to provide because it requires accumulating two pieces of information (speed and instantaneous fuel usage) and then doing some calculations thereon while the vehicle is moving. This processing could be done by a remote host but there, it would be difficult to upload the raw data fast enough to be useful.

According to the present invention, Engine Parameters Service 220 will always try to formulate data for Unified Parameter 101 of Moving Fuel by scanning the protocols of Underlying Vehicle Protocols Layer 400 for two base parameters-vehicle speed and instantaneous fuel usage (or fuel rate). The available protocols that might provide this data are J1939, J1979, J1708/J1587, or OBDII gateway. There is no inherently canonical order to check them since any particular diagnostic device is only likely to have data coming from one vehicle bus. GPS might be considered a less reliable source than a protocol of Underlying Vehicle Protocols Layer 400 and will only be used when a piece of data cannot be obtained from a protocol of Underlying Vehicle Protocol Layer 400.

Once speed and fuel rate are acquired, Engine Parameters Service 220 calculates Unified Parameter 101 of Moving Fuel by integrating fuel rate over time while the vehicle is moving. Idle fuel is calculated the same way while the vehicle is not moving. These two parameters are then made available to Unified Parameters Service 100 to create Unified Parameter 101 of Moving Fuel and send to a remote host.

Unified Parameters Service 100 is configurable by the user to select the parameters to be reported as well as when and how they are to be reported (or cleared). Where the user has configured Unified Parameters Service 100 to report Moving Fuel upon a certain event—a Trigger Event (explained below in conjunction with reporting), the most likely scenario is to report at "ignition off" and clear it at "ignition on" (but there are other configurations). When the Trigger Event of reporting occurs (ignition "off" in this example), Unified Parameters Service 100 asks the Engine Parameters Service 220 for the accumulated data for Moving Fuel. Unified Parameters Service 100 then formulates a message with the Moving Fuel data and sends to the host.

As alluded to above, Unified Parameters Service 100 feature is an event driven or event triggered system. Reporting (and clearing) of the monitored data is done on the occurrence of user-specified Trigger Events. Supported Trigger Events may include (without limitation): "ignition on", "ignition off", Driver Login, Driver Logout, Count Increments, Elapsed Time and Geofence Crossings. As known in the art, a geofence is a "virtual" boundary or perimeter that can be configured on a location-aware device that, when crossed, generates a specified action.

As (non-limiting) examples of the above, geofencing crossings may be parameterized by user-configured geofence class or type (for example, fuel level reported at fuel stations for certain fleet types of vehicles). Also, it may be useful to monitor the number of excessive speeding events, and also report where each event occurred and the speed at the time. This can be done by monitoring parameter SPC (speeding count) and specifying that a report be generated when the count increments.

Reporting can be in form and content usefully configurable by the user, i.e. to specify a Trigger Event and the list of Unified Parameters Service 100 to report when that Trigger Event occurs. Some sample report commands are below.

unify report <event>

Displays the list of Unified Parameters 101 that will report when that Trigger Event occurs unify report <event> <param>[<param>[<param . . . ]]

Configures the list of Unified Parameters 101 that will report when the Trigger Event occurs.

Where:

<param> is the identifier of the Unified Parameter 101 to be monitored

<event> can be:

ign_on
ign_off
login
logout
incr Typically used when a 'count' parameter increments
1-86400 A number representing seconds between reports Examples:

unify report ign_off ETM ODO TFL

Report engine time, odometer, and total fuel used at ignition off.

unify report 60 ITM ETM MTM

Report idle time, engine time, and moving time every 60 seconds unify report incr SPC ESC ORC Report speeding, excess speeding, or over RPM whenever the count parameter increments The preceding highlights the unified upstream packaging and flow of data. Unification can also proceed downstream advantageously.

Typically, all of the Unified Parameters 101 defined and listed for a Trigger Event are reported when that Trigger Event occurs. For example, multiple Unified Parameters are reported when an Ignition Off Trigger Event occurs. But when an increment event occurs it only makes sense to report the Unified Parameter 101 that caused the increment event.

Clear

The Clear command specifies an event and the list of Unified Parameters 101 to be cleared when that event occurs. Such listed data may (if the user configures) be cleared automatically after dispatch of the report associated with the event. Therefore it is possible to have data that is always accumulating and never clears, or to have data that is reported periodically but only cleared at ignition off, for example.

unify clear <event>

Displays the list of parameters that will be cleared when the event occurs.

unify clear <event> <param>[<param>[<param> . . . ]]

Configures the list of parameters that will be cleared when the event occurs.

Examples (non-limiting) include:

unify clear ign_off ETM ODO TFL

Clear engine time, odometer, and fuel usage at ignition off unify clear 60 ITM ETM MTM Clear idle time, engine time, and moving time every 60 seconds unify clear incr SPC ESC ORC Clear speeding, excess speeding, or over RPM count whenever the count parameter increments. Note that only the count that actually incremented, is cleared.

The implementation can be implemented in a conventional vehicle telematics device by programming the operations with any standard programming language like C, C++ or assembler that is capable of converting to the microprocessor's machine code. There are no special hardware requirements (including the microprocessor) except for interface devices to input and decode the vehicle's protocol messages (of Underlying Vehicle Protocols Layer 400), and such devices are commercially available devices specifically designed for any of the vehicle protocols (CAN, J1850, or ISO9141, etc.) mentioned herein.

Herein, the term "protocol" means the formal description of message and/or information formats and the rules for exchanging them; but also the term is used as shorthand, where the context indicates, for the interface and the hardware/software that implements and uses the protocol (to permit activities like, for examples, the protocol being a source of data or the protocol being monitored or interrogated).

Although the method and apparatus of the present invention has been described in connection with the preferred embodiment, it is not intended to be limited to the specific form set forth herein or the examples given herein, but on the contrary, it is intended to cover such alternatives, modifications, and equivalents, as can be reasonably included within the spirit and scope of the invention as defined by the appended claims. All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

The invention claimed is:

1. A method for reporting vehicle data composing processor implemented steps of:
   assigning a rank to each of a plurality of sources of data for each of a plurality of parameters,
   wherein the sources of data are connected to the processor, and
   wherein the rank depends on at least one of
   reliability of the source of data and
   resolution of data obtainable from the source of data;
   receiving a user specified parameter to be reported, which is selected from said plurality of parameters;
   determining, from said plurality of sources of data which source of data to use for the selected parameter based on the ranks assigned to the sources of data,
   wherein multiple of said sources of data can be used for the selected parameter; obtaining data from the determined source of data; and
   transmitting, to a remote host, a value of the selected parameter based on the obtained data;
   wherein at least one source of data is a vehicle protocol data source; and
   another source of data is an additional data provider:
   further comprising one or more data concentrators;
   wherein the value of the parameter is based on data obtained via one or more data concentrators, each data concentrator configured to perform a calculation on data obtained from multiple of the plurality of sources of data; and
   the one or more processors are further configured to:
   receive a user specified format in which the parameter is to be reported; and
   convert the obtained data such that the value of the parameter transmitted is in the specified format.

2. The method according to claim 1 further comprising the processor implemented steps of:
   receiving a user specified format in which the selected parameter is to be reported; and
   converting the obtained data into the specified format before transmitting.

3. The method according to claim 1 further comprising the processor implemented step of performing a calculation on the obtained data before transmitting.

4. The method according to claim 3 further comprising the processor implemented step of performing a calculation on data obtained from at least two sources of data to result in the value of the selected parameter.

5. The method according to claim 4 further comprising the processor implemented step of combining obtained data having a high resolution with obtained data having a low resolution.

6. The method according to claim 1 wherein the data is obtained via one or more data concentrators selected from the group comprising a speedometer, an odometer, an engine parameter service and a harsh driving service.

7. The method according to claim 6 wherein:
   at least one source of data is a vehicle protocol data source, and
   another source of data is an additional data provider;
   wherein the additional data provider is selected from the group comprising a GPS device and an accelerometer.

8. A method according to claim 1 wherein the sources of data are selected from the group comprising a GPS device and an accelerometer.

9. The method according to claim 1 wherein the selected parameter is specified independently of the sources of data.

10. The method according to claim 1 wherein the value of the selected parameter is transmitted upon receiving a request from a user.

11. The method according to claim 1 wherein the value of the selected parameter is transmitted upon detecting a trigger which is specified by a user, wherein the trigger is selected from the group comprising ignition on, ignition off, driver login, driver logout, a count increment, an elapsed time and a geofence crossing.

12. The method according to claim 1 wherein a plurality of different selected parameters are specified and corresponding values of the different parameters are transmitted together.

13. The method according to claim 1 wherein the selected parameter is a count of an event and the value of the selected parameter is incremented each time the obtained data indicates an occurrence of the event.

14. The method according to claim 13 wherein the value is transmitted only if it changes.

15. The method according to claim 13 wherein the event is selected from the group comprising speeding, excessive speeding, over RPM, extreme RPM, braking, hard braking, extreme braking, harsh acceleration, extreme harsh acceleration, sharp turn, extreme sharp turn and power take-off.

16. The method according to claim 1 wherein the value of the selected parameter is cleared after transmitting, cleared after an event or never cleared.

17. The method according to claim 1 wherein data is received from the plurality of sources of data in one or more protocol standards selected from the group comprising J1587, J1708, J1939, J1979, OBD-II and proprietary.

18. A system for reporting vehicle data comprising:
   one or more processors;
   a user input;
   a transmitter; and
   a plurality of sources of data;
   the one or more processors being configured, by executing code to:
   receive, via the input, a user specified parameter to be reported;

determine, based on a rank assigned to each source of data for said user specified parameter, which source or sources of data to use for the parameter wherein the rank depends on at least one of reliability of the source of data and resolution of data obtainable from the source of data, and wherein multiple of said sources of data can be used for the parameter;

obtain data from the determined source or sources of data; and transmit, via the transmitter, a value of the parameter based on the obtained data;

wherein at least one source of data is a vehicle protocol data source; and another source of data is an additional data provider:

further comprising one or more data concentrators;

wherein the value of the parameter is based on data obtained via one or more data concentrators, each data concentrator configured to perform a calculation on data obtained from multiple of the plurality of sources of data; and the one or more processors are further configured to:

receive a user specified format in which the parameter is to be reported; and convert the obtained data such that the value of the parameter transmitted is in the specified format.

* * * * *